Dec. 1, 1931. O. H. DICKE 1,834,447
ELECTRICAL APPARATUS
Filed May 12, 1924
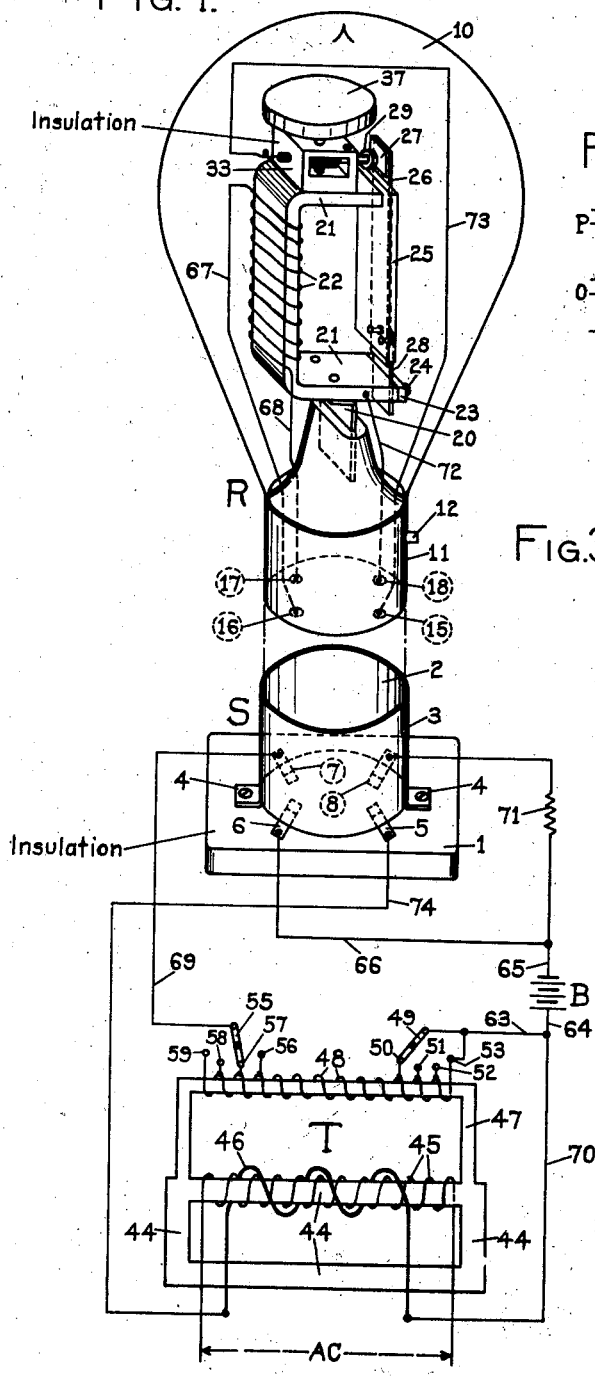
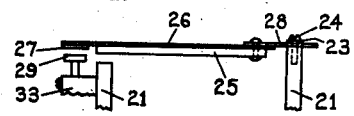
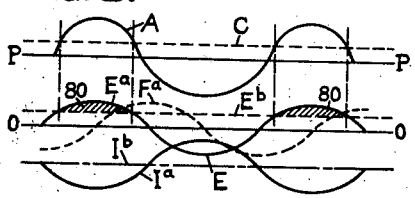
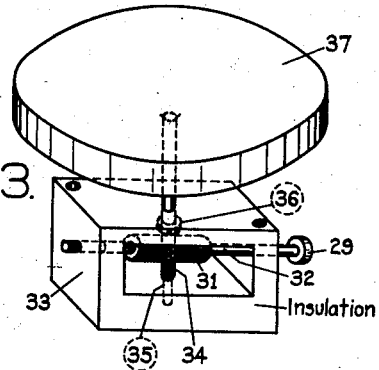
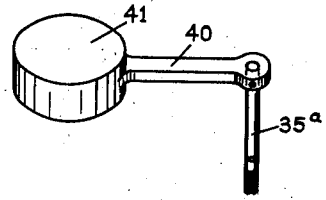
INVENTOR.
O. H. Dicke Patented Dec. 1, 1931

1,834,447

UNITED STATES PATENT OFFICE

OSCAR H. DICKE, OF ROCHESTER, NEW YORK, ASSIGNOR OF ONE-HALF TO ALLEN A. DICKE, OF MONTCLAIR, NEW JERSEY

ELECTRICAL APPARATUS

Application filed May 12, 1924. Serial No. 712,630.

This invention relates to rectifiers for changing alternating current into pulsating uni-directional current, and more particularly to rectifiers of the mechanical vibratory type.

Generally speaking, rectifiers of this type comprise an armature operated by the flux due to co-action of alternating magneto-motive force and uni-directional magneto-motive force, so that, the armature makes one complete oscillation for each cycle of alternating current as distinguished from two oscillations per cycle as would occur if alternating current alone were used to actuate a soft iron armature. Since, as is well known by those skilled in the electrical art, magnetism is in phase with current producing it and current flowing in a coil by reason of the self induction of such coil lags behind the voltage producing such current, the magnetism lags behind the alternating source of potential, and in order to cause this armature to be in an attracted position when the alternating potential is a maximum in one direction it is necessary to employ some form of phase displacing phenomena or means to effect a proper commutation of alternating current by contacts operated by such armature. That is, if the armature is to properly rectify or commutate current by making and breaking a circuit by contacts associated with such armature, provision must be made to cause this armature to operate in synchronism with the alternating potential.

Two methods for accomplishing such synchronous operation of the armature have heretofore been recognized and employed, namely:—(1) by tuning the armature so as to have a natural period of vibration substantially the same as that of the alternating current to be rectified and operate such an armature by current in phase with the alternating potential, current of proper phase relation being obtained by connecting a condenser in series with the electro-magnet acting on such armature, and (2) tuning the armature so as to have a natural period of vibration considerably lower than that of the frequency of that of the alternating current, so that the vibration of the armature is forced, so to speak, thus causing the vibration of the armature to lag behind the force producing it, that is the magnetism operating the same, the relation of the natural period of the armature to that of the frequency of the alternating current to be rectified being such that the armature operates in synchronism with the alternating current potential. In accordance with the preferred form of the present invention it is proposed to tune the armature so that its natural period of vibration is the same as that of the alternating current to be rectified and to actuate this armature by alternating current which lags substantially 180° behind the source of electro-motive force, this current being obtained by dividing the core of a suitable transformer into two multiple paths one of which contains a winding together with a bucking coil, if desired, so that a voltage is induced in this winding due to the magneto-motive force of the main transformer winding and that of the magneto-motive force due to current flowing in such bucking coil, the various constants being so chosen that the angle of the lag of this magneto-motive force behind that of the voltage producing it and that of the lag of the current produced in said winding behind that of this magnetism is substantially 180° so that the armature operates in phase opposition with respect to the source of potential, whereby by reversing the connections the device rectifies current in the proper direction.

With rectifiers of this type as well as magnetically operated rectifiers of other types, it has been experienced that sparkless commutation is difficult to maintain for any great period of time, because a slight change in the contact adjustment, possibly due to wearing down of such contacts, causes the time phase operation of the contacts to change sufficiently to cause improper commutation. Also, rectifiers of the magnetically vibratory type produce a considerable hum and vibratory noise, and for this reason it is considered desirable to subdue or muffle such noises.

With the foregoing problems and difficulties as well as other considerations in mind, it is proposed in accordance with the present invention to produce a pulsating current by superimposing an alternating current which lags substantially 180° behind the source of potential upon a direct current so that an armature tuned to the frequency of the alternating current is adapted to operate contacts to rectify current in the proper manner as above mentioned; to apply this current to an electro-magnet having an armature tuned to the frequency of an alternating current in a closed casing containing an inert gas which does not support combustion so as to reduce sparking and especially oxidation and depreciation or consumption of these contacts; to provide means whereby the contact spacing of such contacts may be adjusted from the outside of the casing containing the same, and to mount the armature magnet for operating such armature so as to prevent the reaction of the armature upon the electro-magnet from vibrating the casing containing the same, and in turn prevent the transmission of noise.

Other objects, purposes and characteristic features of the invention will in part be pointed out hereinafter and in part be obvious from the drawings.

In describing the invention in detail reference will be made to the accompanying drawings, in which:—

Fig. 1 is a diagrammatic view of the one embodiment of the present invention, in which the rectifier element mounting and a novel form of rectifying system has been shown in perspective;

Fig. 2 is a side elevation of the armature or reed of the rectifier element together with the contacts associated therewith;

Fig. 3 is an enlarged perspective view of the externally controllable contact adjusting means for adjusting the contacts in the casing or globe, shown in Fig. 1;

Fig. 4 is a modified form of mass for the device shown in Fig. 3; and

Fig. 5 graphically illustrates some of the time phase relations of potentials, currents, fluxes and armature positions in the rectifying system shown.

Generally speaking, the present invention relates to a novel rectifying system which includes means for housing contacts which are used to intermittently break electrical circuits such as used for battery charging purposes so as to reduce oxidization of such contacts. This housing of contacts is, however, not limited to this narrow use, but may be used in voltage regulators, relays and the like, and consists in mounting such contacts in a casing containing an inert gas in a manner so that these contacts may be adjusted from the outside; but for convenience contacts housed in this manner have been illustrated in a novel rectifying system in which the rectifying element includes a globe similar to that of an incandescent electric lamp containing inert gas in which the magnetically operated contacts are mounted.

Referring particularly to Fig. 1 illustrating one embodiment of the present invention, there has been shown a socket of the usual construction comprising a base 1 upon which a socket shell 2, having the usual hook shaped bayonet slot 3, is fastened by screws 4, four spring pressed contacts 5, 6, 7 and 8 being fastened to the insulating base 1 in any suitable manner. Directly above the socket S is illustrated the rectifier element R which comprises a lamp globe 10 of the usual construction having a metallic cylindrical base 11 including the usual bayonet type detachable connection consisting of a projecting pin 12, which is adapted to engage the hook shaped bayonet slot 3 in the socket S. This base contains four contacts 15, 16, 17 and 18 which are adapted to cooperate with the spring contacts 5, 6, 7 and 8 respectively. The parts thus far specifically mentioned are similar to corresponding parts of the vacuum tube amplifiers or audions used in radio receiving apparatus.

In the globe 10 upon the leaf spring bracket 20 is mounted a U-shaped soft iron core 21 containing a winding 22 of the proper number of turns as more clearly pointed out hereinafter. To the lower end of the core 21 is clamped a tuned reed by the strap 23 secured by screws 24. This tuned reed has more clearly been shown in Fig. 2 of the drawings and comprises an armature 25 to which is riveted a contact spring 26 containing a contact 27 and a main spring 28. In practice this tuned reed is so tuned that when it is vibrated to an extent that the contact 27 engages the stationary contact 29 during each cycle the natural period of the reed is substantially equal to that of the alternating current to be rectified.

Since, as heretofore mentioned, it is desirable to be able to adjust the spacing between contacts 27 and 29 a very unique inertia mechanism has been devised, whereby the adjustment of these contacts may be changed from the outside of the globe without the necessity of a medium passing through the wall of the globe to accomplish such adjustment. The spindle 32 on which the contact 29 is mounted (see Fig. 3) has its other end threaded into the insulating block 33 so that turning of this spindle changes the spaced relation of contacts 27 and 29. In the particular structure illustrated this spindle 32 has a rather wide worm wheel 31 keyed thereto which is engaged by the worm 34 contained on the spindle 35 so that by rotation of the spindle 35 this spindle 32 may be rotated but at a much slower rate, and by reason of the threaded engagement of this spindle with the insulating block 33 the adjusted position of the contact 29 may be gradually changed. This spindle 35 is journaled in the insulating block 33 at two different places, as shown, and is held in the proper axially spaced relation with this block by having a shoulder engaging the bottom wall of this block and having a collar 36 pinned thereto which engages the inside of the upper wall of this block. To the projecting end of this spindle 35 is fastened a fly wheel 37 in any suitable manner.

By looking at Figs. 1 and 3 it will be noted that if the lamp globe or rectifier element is gradually rotated about its axis and is then suddenly stopped that the fly wheel 37 will continue its rotation and will thereby assume a different position than it assumed previously, so that, if this procedure is repeated the contact 29 may be moved toward or away from the insulating block 33 to any extent, and in a direction depending on the direction of rotation of the rectifier element.

It will be noted that the worm or spiral gear is rather wide. This gear is preferably considerably wider than the worm 34 so that endwise movement of the spindle 32 does not disturb the meshed relation between this worm and gear. The contacts 27 and 29 are preferably composed of material having a very high melting and oxidizing point such as tungsten, tungsten steel, platinum or the like, so that a certain amount of sparking that is bound to occur during starting and stopping of the rectifier will not materially effect these contacts.

In Fig. 4 has been shown a modified form of inertia device similar to that of the balance wheel 37 shown in Figs. 1 and 3, which consists of a pendulum comprising an arm 40 having an enlarged head 41 pinned to the spindle 35$^a$. The device shown in Fig. 4 may be substituted for the spindle 35 and fly wheel 37 shown in Fig. 3, so that the contact 29 may be adjusted by swinging the pendulum about the axis of the spindle 35$^a$. If an inertia device of this type of construction is used, the contacts may be adjusted by rotating the rectifier element about its axis when this axis is disposed horizontally, that is, the head 41 will remain in the pendent position in spite of such rotation and rotation of the rectifier element R causes rotation of the spindle 35$^a$ within the insulating block 33, and in turn effects adjustment of the contacts.

In Fig. 1 is shown a rectifier transformer comprising a rectangular main core 44 having a primary winding 45 and a secondary winding 46 contained on one side thereof. This main core 44 is provided with a shunt magnetic core 47 arranged in shunt with that portion of the core 44 not containing a winding, and with this shunt core portion containing a winding 48 a variable portion of which may be short circuited by the switch 49 cooperating with contacts 50, 51, 52 and 53 and of which the effective number of turns may be varied by the switch 55 cooperating with contacts 56, 57, 58 and 59. This transformer T is connected to a source of energy AC, a battery B and the spring contacts of the socket S in such a manner that the winding 22 of the rectifier element is connected in a circuit including the battery B and the winding 48 in series; and the secondary winding 46 is connected in series with the battery B through the contacts 27 and 29 of the rectifier element R when this rectifier element is in position in the socket S; so that proper vibration of the armature 25 connects the secondary winding to the battery B intermittently at such times when the potential is in a direction to charge such battery.

The circuit for conducting pulsating current to the winding 22 of the rectifier element may be traced as follows:—beginning at the coil 48 of the transformer T, switch 49 in multiple with the shorted turns of this coil, wires 63 and 64, battery B, wires 65, 66 and 67, winding 22 of the rectifier element R, wires 68 and 69, switch 55 back to the coil 48. The relation of the number of turns in the coil 22, the number of effective turns in the coil 48 and the bucking action of the short circuited turns of this coil 48 is such that the current flowing in this circuit lags substantially 180° behind the voltage induced in the secondary winding 46 of the transformer T, this current preferably lagging a little less than this amount so that a slight lagging of the armature behind this pulsating current still produces proper commutation. It will be noted by reason of the fact that the core 47 of the transformer T is magnetically shunted by the core portion 44 not containing a winding, that the current flowing in the coil 48 will lag considerably more than it would otherwise by reason of the loose coupling, so to speak, formed between this coil 48 and the primary winding 45 of this transformer, this also depending on the constants of the circuit including the coils 48 and 22 in series, and on the action of the bucking coil comprising the turns short circuited by switch 49.

The charging circuit in which the rectified current is adapted to flow may be traced as follows:—beginning at the secondary winding 46 of the transformer T, wires 70 and 64, battery B, wire 65, limiting resistance 71, wire 72 through the contact spring 26 of the rectifying element to the stationary contact 29 thereof, through wires 73 and 74, back to the secondary winding 46 of the transformer T. This secondary winding 46 of the transformer is so connected in this circuit, just traced, that the battery B is charged when the armature 25 is operated in synchronism with the alternating potential in a manner as heretofore described.

The present invention permits the time phase actuation of the armature to be varied by three different adjustable devices. In the first instance proper commutation may be obtained by adjusting the spacing between contacts 29 and 27 so as to properly charge the battery with very little sparking at the contacts, this for the reason that the natural period of the armature is changed since the spring 26 is tensioned through a larger or smaller portion of each cycle of the armature and also the instant at which the contacts open occurs at a different point in the cycle. In the second place the phase relation of the pulsating current flowing in the winding 22 may be varied by changing the ratio of the effective turns in coil 48 to that of the turns in coil 22; and further this phase relation may be changed by varying the number of short circuited turns of the winding 48 by adjusting the switch 49. These various adjustable devices whereby the commutation of the rectifier element may be changed are very useful in practice, because adjustment of the contacts is not readily accomplished without taking the rectifier element or globe R out of the socket, and therefore it would be extremely tedious to try to adjust the sparkless commutation by the cut-and-try method of removing the globe each time that a change in the adjustment is to be made. For example, in practice the globe may be removed from its socket and the air-gap between the contacts 27 and 29 adjusted to a distance which seems correct to men experienced in this line of work, after which the globe R will be reinserted in the socket S. If the rectifier does not function properly, or sparks considerably, after this procedure, this sparking may be reduced by changing the adjustment of either or both the switches 55 and 49.

Since it is desirable to have the contacts 27 and 29 closed only when the potential of the alternating current is above that of the battery to be charged when this potential is in a direction to charge such battery, it is found necessary to design these various parts so that not only are these contacts opened at a time to reduce sparking to a minimum, but these contacts are closed at a time when the alternating current voltage just exceeds the battery voltage at the beginning of that wave of an alternating current cycle which is to be rectified. As heretofore mentioned it is desirable to have the armature tuned to the frequency of the alternating current to be rectified when this armature is in motion to an extent to close the contacts in each cycle. Also, it is readily understood that during that portion of the oscillation of the armature 25 during which the contacts 27 and 29 cooperate that the spring tension tending to return the armature to its neutral position is the force of the two springs 26 and 28, and is therefore tuned to a higher frequency than when these contacts are not in contacting relation and the spring tension acting on armature 25 is that of the spring 28 alone. Further, it is desirable to have the contacts 27 and 29 adjusted very closely so that only a slight attraction of the armature is necessary until the armature assumes this higher tuned condition.

In Fig. 5 has been graphically illustrated the time phase relation of various potentials, currents, magnetic fluxes and armature positions of the rectifying system shown in Fig. 1. The line O—O represents the zero or datum line for potentials, currents and fluxes, and the line P—P illustrates the neutral or normal position of the armature, the distances from left to right denoting time. The curve $E^a$ represents the potentials of the alternating current applied to the transformer and induced in the winding 46, the dotted curve $F^a$ represents the flux passing through the main portion of the core of the transformer containing the main winding, the line $E^b$ represents the potential of the battery B, the dotted line $I^b$ represents the direct current flowing in the winding 22 which, for convenience has been assumed to be negative, and the curve $I^a$ represents the alternating current flowing in this same winding with the dotted line $I^b$ taken as the base line for this curve so that this curve $I^a$ as a matter of fact represents the pulsating current flowing in this winding 22 with respect to the main base line O—O.

Referring to the top portion of Fig. 5 and remembering that the line P—P represents the position of the armature with the direct current $I^b$ only flowing, the curve A illustrates by distances from points on this curve to the line P—P the various positions of the armature when the rectifier is in operation with respect to the neutral position indicated by this line. The dotted line C represents the position of the armature A when the contacts are just touching, so that the horizontal distance between each of the two pairs of vertical dotted lines shown represents the time during which the contacts 27 and 29 are closed. It will be noted that the first wave of a cycle of the curve A with respect to the base line P—P is smaller than the second or bottom wave, that is consumes less time, than does the second wave of such cycle. This is because the springs 26 and 28 on the armature 25 are both tensioned and the armature is tuned to a higher frequency than it is during the second wave of such cycle when only the spring 28 tends to return the armature to its normal position; so that, the time during which the armature is on one side of its normal neutral position is less than the time it is on the opposite side thereof.

It is, of course, understood that the flux in the core portion 44 containing the windings 45 and 46 as shown by the curve $F^a$ lags substantially 90° behind the voltage producing it (see Fig. 5), namely that as illustrated by the curve $E^a$, and as heretofore brought out the current flowing in the winding 22 lags substantially 90° behind the flux F<sup>a</sup> as illustrated by the alternating current wave I<sup>a</sup>. As above pointed out it is desired to have the contacts closed during the time interval indicated by the shaded area 80 (see Fig. 5) so that the total quantity of available current as represented by this area may flow into the battery B. The various parts are so proportioned that the time represented by the first wave of the cycle of armature movement, as prepresented by the curve A above the line C (contacting line) is the same as that of the time represented by the horizontal distance of the shaded area, and that these periods of time transpire at the same time during a cycle. In other words, the various parts are so proportioned and the constants are so chosen, that the relation between the first and second wave of the curve A with respect to the spacing of the contacts 27 and 29, as indicated by the distance between line P—P and line C, is such that these contacts are closed when the voltage as represented by curve E<sup>a</sup> is above the voltage of the battery B as indicated by the line E<sup>b</sup>. The net result is, the contacts 27 and 29 close at a point when the voltage in the secondary winding 46 is such that the current tends to flow to the battery and again open when such current reaches the zero value, so that maximum charging of the battery and minimum sparking at the contacts follows, thus resulting in a maximum efficiency.

Applicant has thus devised a rectifying system which is practically noiseless, and in which the harmful effect of sparking has been reduced to a minimum by placing these contacts in an air-tight glass globe containing an inert gas and mounted on a base similar to that of an electric lamp or vacuum tube and which may be sealed in the same manner, that is, may be hermetically sealed. The rectifying element or electro-magnet being mounted on a spring support 20 so that the reaction of the armature 25 acting upon this magnet 21 permits vibration of the magnet within the globe so that such vibration can be transmitted to the globe to a very slight extent only, and therefore reduces the vibration of this globe and noise to a minimum. It should however be understood that the magnet 21 may be mounted within the globe 10 rigidly if desired. Although, only one particular arrangement has been shown for vibrating an armature containing contacts enclosed in a sealed container containing inert gas, it is desired to be understood that any other method of vibrating such an armature may be employed. Further, it is desired to be understood that the present invention as far as the protection of intermittently operated contacts is concerned may be applied to devices other than rectifiers and that the invention is not limited to this particular field of use, for instance, it may be applied to intermittently operated contacts such as used in voltage regulators.

Having thus shown and described several specific embodiments of the invention in a rather specific manner it is desired to be understood that this has been done to illustrate the nature of the invention rather than the scope thereof, and that various additions and modifications may be made to adapt the invention to the particular problems or systems in connection with which it is to be used in practicing the invention without departing from the scope thereof or the idea of means underlying the same.

What is desired to be secured by Letters Patent of the United States is:—

1. In a rectifier for changing alternating current to pulsating uni-directional current comprising, a core, means for setting up an alternating magneto-motive force in said core, means acted upon by said magneto-motive force for producing a flux lagging behind said magneto-motive force, a vibratory reed actuated by current generated by said lagging flux, contacts operated by said reed, and means for confining said contacts in an inert gas.

2. In a rectifying system, the combination of a closed core of magnetic material, a winding on the core connected to a source of alternating current, said core having a portion thereof divided to form a magnetic shunt for a portion of the path of said core, a coil on sad magnetic shunt, and means for varying the effective number of turns of said coil.

3. In a rectifying system, the combination of a core forming a closed magnetic circuit, a winding on said core, a magnetic shunt for said core, a coil on said magnetic shunt, a shorted coil on said magnetic shunt, and of a rectifying element operated by current induced in said first coil.

4. In a rectifying system, the combination of a core forming a closed magnetic circuit, a winding on said core, a magnetic shunt for said core, a coil on said magnetic shunt, means for varying the effective number of turns in said coil, and of a rectifyng element operated by current induced in said coil.

5. In a rectifying system, the combination of a rectifying element including a winding, means operated in synchronism with the current flowing in said winding for commutating a current, and of means for energizing said winding by a periodically varying current including, a core energized by alternating current having a portion thereof divided into two parts, one of said parts being provided with a bucking coil, and means for varying the effectiveness of said bucking coil.

6. In a device for changing alternating current to uni-directional pulsating current, the combination of a magnetizable core, a winding on said core, a spring supported armature supported by said core for vibration in a one plane only, and spring means for supporting said core on a base to permit vibration of said core in the same plane as said armature, whereby the reaction of said armature cannot act back on the base on which said spring means is mounted.

7. In a rectifying system for changing an alternating current into a pulsating direct current, the combination of a rectifying element including a coil, and means for energizing said coil by current of the desired phase relation with respect to the voltage of a source of supply comprising, a closed core having a magnetic shunt in multiple with part of the main magnetic path, and a winding on said shunt connected to said coil.

8. In a rectifying system, the combination of a rectifying element including a winding, a source of current, and mechanism for intermittently closing a circuit responsive to the flow of an undulating current in said winding; and of means for energizing said winding by a current having a phase relation with respect to the voltage of said source so that the circuit closing mechanism will be operated to commutate current from said source, said means including two magnetic circuits, a coil linking both magnetic circuits and connected to said source, and a winding linking only one of said magnetic circuits connected in series with said first mentioned winding.

9. In combination, a winding on a core, a bridge on said core, means for supplying an alternating electro-motive force to said winding to create a periodic flux in said core, a second winding entirely linking said bridge, and means for displacing the relative phases of the fluxes in said bridge and said core so that the electro-motive force induced in said second winding is out of phase with respect to said first electro-motive force.

10. In a phase shifting device comprising, means for producing an alternating flux, means for causing one component of said flux to lag behind the rest of said flux, a coil linked by the lagging component of said flux, and adjustable means for varying the degree of lag of said lagging flux.

11. A transformer for producing a lagging voltage comprising, a core of magnetic material having a portion thereof divided into two paths, a primary winding on the undivided portion of said core, a secondary winding on one of the two divided paths adapted to have a voltage induced therein from said primary winding, and adjustable means associated with said core whereby the phase relation of the flux in the path having the secondary winding thereon and in turn the voltage induced in said secondary winding with respect to the voltage impressed on said primary winding may be changed.

12. A transformer for changing single phase alternating current to two-phase alternating current comprising, a core, a primary winding for creating periodic flux in said core, a secondary winding associated with said core and insulated from said primary winding, means for causing part of said periodic flux to lag behind the rest of said flux, and another secondary winding linked by said lagging flux.

13. In combination, a winding on a core, a bridge on said core, means for supplying an alternating electro-motive-force to said winding to create a periodic flux in said core, a second winding on said bridge, and adjustable means for displacing the relative phases of the fluxes in said bridge and said core so that the electro-motive-force induced in said secondary winding is out of phase with respect to said first electro-motive-force to a predetermined extent depending on the adjustment of said adjustable means.

14. In combination, a hermetically sealed container having a glass seal, a pair of rectifying electrodes in said container, and pivotally supported rotatable means wholly within said container for changing the spaced relation of said electrodes.

15. In a phase shifting device for producing a lagging voltage comprising, a core of magnetic material forming magnetic circuits having two paths, a primary winding on said core for producing an alternating flux therein, means associated with one of said paths for causing the flux in said path to lag behind the flux in said other path, a winding linked by said lagging flux, and another winding inductively associated with said primary winding.

16. Induction apparatus comprising, a structure of magnetic material having two magnetic paths, an energizing winding common to both of said paths to create an alternating magnetomotive force in said structure tending to create magnetic flux in both of said paths, a bucking coil on one of said paths, a third magnetic path, and a circuit linking said third path and said path containing said bucking coil.

17. Electric-responsive apparatus comprising, two magnetic paths having a portion thereof in common one path of which is a substantially closed path of iron, a winding on said common portion connected to a source of alternating current, a bucking coil linking only said substantially closed path, a third magnetic path including a movable element and an air-gap, and an electric circuit linking said substantially closed path and said third path to produce a lagging flux in said element.

18. Induction apparatus comprising, a structure of magnetic material having two magnetic paths, an energizing winding common to both of said paths to create an alternating magnetomotive force in said structure tending to create magnetic flux in both of said paths, a bucking coil and a secondary winding on one of said paths, an electro-responsive device having a winding, and a circuit including the winding of said electro-responsive device and said secondary winding in series.

19. Electro-responsive apparatus comprising, two magnetic paths having a portion thereof in common one path of which is a closed path of iron, a winding on said common portion connected to a source of alternating current, a bucking coil linking only said closed path, a third magnetic path including a movable element and an air-gap, and an electric circuit linking said closed path and said third path to produce a lagging flux in said element.

20. Phase shifting means for producing a lagging flux in an air-gap comprising, a magnetic circuit including such air-gap, a second magnetic circuit of lower reluctance than said magnetic circuit having such air-gap, means for exciting said second magnetic circuit with alternating flux, a shading coil linking said second magnetic circuit to cause said flux to lag, and an electric circuit linking both of said magnetic circuits to induce a lagging magneto-motive force in said first mentioned magnetic circuit.

21. Means for producing a lagging flux in an air-gap comprising, a magnetic path consisting of iron having an air-gap, a second magnetic path constituting a closed path of iron, means for exciting said second magnetic path with alternating flux, a shading coil entirely linking said second magnetic path, and an electric circuit linking both of said magnetic paths.

22. Means for producing a lagging flux in an air-gap comprising, a magnetic circuit having an air-gap, a second magnetic circuit of lower reluctance than said magnetic circuit having an air-gap, a winding linking said second magnetic circuit connected to a source of alternating current to create an alternating magneto-motive force in said second magnetic circuit, a shading coil linking said second magnetic circuit to cause the flux therein due to said magneto-motive force to lag, and an electric circuit linking both of said magnetic circuits to produce a lagging flux in said air-gap.

23. Means for producing a lagging flux in an air-gap comprising, a magnetic circuit having an air-gap, a second magnetic circuit constituting a closed path of iron, a winding linking said second magnetic circuit connected to a source of alternating current to create an alternating magneto-motive force in said second magnetic circuit, a shading coil linking said second magnetic circuit to cause the flux therein to lag, and an electric circuit linking both of said magnetic circuits to produce a lagging flux in said air-gap.

In testimony whereof I affix my signature.

OSCAR H. DICKE.